(12) United States Patent
Gaillard et al.

(10) Patent No.: US 6,483,971 B2
(45) Date of Patent: Nov. 19, 2002

(54) OPTICAL-FIBER CABLE CONTAINING THERMALLY BONDED FIBER OPTIC BUFFER TUBES AND FABRICATION PROCESS

(75) Inventors: Pierre Gaillard, Calais (FR); J. Boyet Stevens, Maineville, OH (US); Vincent Bourget, Sur Mer (FR); Brian G. Risch, Hickory, NC (US); Stefan Richter, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/810,221

(22) Filed: Mar. 19, 2001

(65) Prior Publication Data

US 2002/0034367 A1 Mar. 21, 2002

(30) Foreign Application Priority Data

Sep. 21, 2000 (FR) .............................. 00 12044

(51) Int. Cl.$^7$ ................................. G02B 6/44
(52) U.S. Cl. ..................................... 385/113
(58) Field of Search ................ 439/109, 110, 439/111, 112, 113, 114

(56) References Cited

U.S. PATENT DOCUMENTS

| | | | | |
|---|---|---|---|---|
| 4,214,430 A | | 7/1980 | Vogelsberg et al. ............... 57/6 |
| 4,615,168 A | | 10/1986 | Oestreich ........................... 57/7 |
| 4,720,164 A | | 1/1988 | Oestreich et al. ............. 385/103 |
| 4,746,190 A | | 5/1988 | Oestreich, et al. ........... 385/112 |
| 4,909,592 A | * | 3/1990 | Arroyo et al. ............. 174/23 C |
| 4,950,049 A | | 8/1990 | Darsey et al. ............... 385/123 |
| 5,071,705 A | * | 12/1991 | Tanaka et al. ............... 156/180 |
| 5,143,786 A | * | 9/1992 | Tanaka et al. ............... 156/180 |
| 5,173,960 A | * | 12/1992 | Dickinson ................ 174/121 A |
| 5,247,599 A | * | 9/1993 | Vyas et al. .................... 385/109 |
| 5,308,668 A | * | 5/1994 | Tsuji .......................... 428/412 |
| 5,325,457 A | * | 6/1994 | Bottoms et al. ............. 385/100 |
| 5,453,333 A | * | 9/1995 | Takauchi et al. ............. 429/142 |
| 5,525,178 A | | 6/1996 | Roggenbuck .......... 156/244.13 |
| 5,546,741 A | | 8/1996 | Karhu .......................... 57/293 |
| 5,684,904 A | * | 11/1997 | Bringuier et al. ........... 385/106 |
| 5,761,361 A | | 6/1998 | Pfandl et al. ................ 385/100 |
| 5,917,977 A | | 6/1999 | Barrett ........................ 385/101 |
| 5,925,461 A | | 7/1999 | Fairgrieve ................... 428/372 |

FOREIGN PATENT DOCUMENTS

| | | |
|---|---|---|
| EP | 0 033 123 | 1/1981 |
| EP | 0 518 738 A1 | 12/1992 |
| EP | 0 813 084 A1 | 12/1997 |
| EP | 0 846 970 A1 | 6/1998 |

* cited by examiner

Primary Examiner—Tulsidas Patel
(74) Attorney, Agent, or Firm—Sughrue Mion, PLLC

(57) ABSTRACT

An optical-fiber cable includes an assembly of buffer tubes including at least two flexible buffer tubes that are held together compactly by adhesion to one another. The cable further includes a plurality of optical fibers, which are housed within the buffer tubes, a jacket surrounding the assembly of buffer tubes, and at least one longitudinal strength member that is provided at the periphery of the assembly of buffer tubes. According to one aspect, the jacket is formed of polyethylene, the buffer tubes are formed of polyvinyl chloride (PVC) or a thermoplastic elastomer possessing flexible diol segments, and the buffer tubes are contained within the jacket in a helical or SZ stranding configuration. According to a second aspect, a fiber optic buffer tube includes low and high melting point materials forming domains and a matrix, respectively, and preferably further includes a filler. The domains are embedded in the matrix. The latter buffer tubes are bonded together by thermal activation of the domains.

45 Claims, 3 Drawing Sheets

OPTICAL-FIBER CABLE CONTAINING THERMALLY BONDED FIBER OPTIC BUFFER TUBES AND FABRICATION PROCESS

BACKGROUND OF THE INVENTION

1. Field of the Invention

The present invention pertains to an improved fiber-optics cable (referred to as optical-fiber cables herein) and to a corresponding fabrication process. In particular, the present invention pertains to a process of bundling optical fiber buffer tubes, to form an improved flexible optical core, and to an improved flexible optical core assembled in a SZ stranding configuration.

2. Discussion of Related Art

There are three general types of optical-fiber cable structures. Typically, for each of the three general structures, the jacket is made of a polymeric material and is extruded around what is commonly referred to as the optical core.

In the first structure, commonly known as a "loose-tube" construction, the optical core includes a central strength member around which buffer tubes are assembled in either a helical or SZ stranding configuration. The buffer tubes contain optical fibers or optical fiber ribbons, and the tube assembly is surrounded by a jacket. In this first structure, the tubes containing the optical fibers have relatively thick and rigid walls, which are made of a polymeric material. With this first structure, the optical fibers can be displaced relative to the tubes, in which they are housed. Cables possessing this first type of structure are described, for example, in U.S. Pat. No. 4,366,667 and European Patent EP-A-0,846,970.

In the second structure, the optical core includes a single tube, typically referred to as central tube construction, which is made of a polymeric material and which houses the optical fibers. If necessary, the central tubes include ribbons that may be assembled together in a spiral configuration. The central tube is surrounded by a jacket that is defined by a wall. Strength members can be embedded in the jacket wall.

In the third type of structure, the optical core includes buffer tubes made of polymeric material. The buffer tubes house the optical fibers and are assembled together in a helical or SZ stranding pattern. The buffer tube assembly is surrounded by a jacket, within which strength members are embedded. In this third structure, the buffer tubes are relatively thin and flexible and hold the optical fibers snugly, such that displacement of the optical fibers relative to each other and to the buffer tubes is highly constrained.

For certain installations, optical-fiber cables may be arranged such that, along certain paths, sections of the cable are vertical. In such vertical sections of optical-fiber cable, an optical core assembled in a SZ stranding configuration can unravel due to the effects of gravity, with each buffer tube tending to unwind and spread out vertically in a rectilinear manner. The risk of de-stranding associated with this undesirable phenomenon is particularly significant near the reversal points, where the winding direction of a buffer tube in a SZ stranding configuration reverses. More generally, unraveling and de-stranding can occur whenever the optical core or the optical cable is subjected to a tensile strain, e.g., during manufacturing or installation.

Optical-fiber cables with the first structure typically include a binder, which holds the buffer tubes in position, thereby avoiding the problem of de-stranding. Binders can be used with such optical-fiber cables because of the relative rigidity of the buffer tubes used in the first type of structure. This rigidity prevents any tightening stress exerted by the binder on the buffer tubes from being transmitted to the optical fibers.

However, binders cannot be used satisfactorily on optical-fiber cables with the third, flexible optical core structure because these cables use thin walled buffer tubes that offer little resistance to the crushing stresses that binders can produce. Consequently, the transverse stress exerted by a binder on the buffer tubes is easily transmitted to the optical fibers, thereby subjecting the optical fibers to stresses that can interfere with their optical performance. Thus, another technique is needed to prevent vertical sections of a flexible optical core or elongated core, assembled in a SZ stranding configuration, from de-stranding.

In addition, the use of binders is undesirable, in that they add cost and require special stranding equipment. Furthermore, accessing the cable requires cutting through the binders, leading to an additional access step. Accordingly, an alternative to the use of binders is desirable for these additional reasons.

An additional problem with known flexible optical cores, which are assembled in a SZ stranding configuration, is that it is difficult to strand the constituent buffer tubes uniformly, to form an optical core of uniform strand geometry. This difficulty stems from the flexibility of the buffer tubes used in such a core and from the absence of a central strength member to support the buffer tubes and couple them by friction. Accordingly, an improved bundling method is needed to improve the core cohesion and to maintain a certain amount of stranding (i.e., the number of turns in the S or Z direction) through subsequent manufacturing steps.

Preferably, the improved tube bundling technique would provide a buffer tube assembly that will maintain its geometry under load. In particular, ensuring a sufficient amount of stranding is essential for core cohesion and bending properties, and in order to provide predictable mid-span access. However, because flexible optical cores possess no central strength member, mechanical relaxation of the buffer tubes, as well as tension applied on the optical core (e.g. during a jacketing process step, or during routing the optical core in a splice box), may cause the buffer tubes to unravel or de-strand. As indicated above, such unraveling or de-stranding poses potential problems. Accordingly, an improved stranding method is needed to maintain ordered stranding under load.

SUMMARY OF THE INVENTION

According to one object of the present invention, it is sought to prevent vertical and/or strained sections of flexible buffer tube, fiber optic cable cores from unraveling or destranding. Additionally, a second object is to avoid the use of binders, thereby reducing costs, providing a streamlined process, and simplifying access to the cables. According to a third object of the present invention, it is sought to provide an improved stranding for optical cores formed of flexible buffer tubes, in order to promote core cohesion, to maintain a certain amount of stranding through subsequent manufacturing steps, and to maintain a uniform stranding geometry under load.

The present invention achieves these and other objectives by providing an opticalfiber cable including an assembly of buffer tubes which includes at least two flexible buffer tubes that are thermally bonded to one another. The optical-fiber cable further includes a plurality of optical fibers, which are housed within the buffer tubes. A jacket surrounds the assembly of buffer tubes.

According to a second aspect of this embodiment, the jacket is made of polyethylene and the tubes are made of polyvinyl chloride (PVC) or a thermoplastic elastomer with flexible diol segments.

According to a third aspect, the buffer tubes are contained within the jacket in either a helical or a SZ stranding configuration.

According to a fourth aspect, the optical-fiber cable includes mechanical reinforcement strands, which are preferably made of aramid and, more preferably, are positioned between the tubes and the jacket and arranged helically.

According to a fifth aspect, at least one strength member is provided at the periphery of the assembly of buffer tubes. Preferably, the strength member is embedded in a wall of the jacket.

According to a sixth aspect, the optical-fiber cable further includes water-proofing elements such as water-proofing tape that is positioned between the tubes and the jacket when in an annular assembly, expandable elements that are positioned within the jacket when in an interwoven tube assembly, and/or a filler material, which is used within the tubes.

The present invention also provides a process for the fabrication of an optical-fiber cable including forming an assembly having at least two flexible buffer tubes, the buffer tubes comprising a polymeric material and housing optical fibers. A jacket comprising a polymeric material is heated to an extrusion temperature and extruded around the buffer tubes to surround the assembly of buffer tubes. The buffer tubes are thermally bonded to one another by controlling the extrusion temperature of the polymeric jacket material.

According to another characteristic of this process, the jacket is made of polyethylene and the tubes are made of polyvinyl chloride (PVC) or of a thermoplastic elastomer possessing flexible diol segments, whereby the extrusion temperature is between 170 and 240° C. More preferably, the extrusion temperature is between 200 and 240° C.

According to yet another characteristic of this process, at least one filiform strength member is provided at the periphery of the assembly of buffer tubes.

A second embodiment of the present invention provides a fiber optic buffer tube formed of a low melting point material forming domains and a high melting point material forming a matrix. The domains are embedded in the matrix.

According to a second aspect of the second embodiment, the low and high melting point materials are a low and a high melting point thermoplastic, respectively.

According to a third aspect, the low melting point material constitutes less than forty percent and, more preferably, less than twenty percent of the buffer tube material.

According to a fourth aspect, the buffer tube further includes a filler. Preferably the filler includes calcium carbonate, talc, and/or super-absorbent polymer. powder. More preferably the filler constitutes less than forty percent of the buffer tube material. Still more preferably, the low melting point material constitutes less than forty percent of the buffer tube material and the high melting point material constitutes more than fifty percent of the buffer tube material.

According to a fifth aspect, the high melting point material has a melting point which is at least 25° C. higher and, preferably, at least 50° C. higher than the melting point of the low melting point material.

According to a sixth aspect, the low melting point material is ethylene-octene copolymer, ethylene-propylene copolymer, EVA copolymer, EAA copolymer, or some other copolymer or terpolymer of a polyolefin.

According to a seventh aspect, the high melting point material is impact modified polypropylene copolymer or propylene-ethylene copolymer. Preferably, the low melting point material is ethylene-octene copolymer, EVA copolymer, or EAA copolymer. More preferably, the buffer tube further includes a calcium carbonate filler, the high melting point material is a propylene-ethylene copolymer with a melting point above 140° C., the low melting point material is an ethylene-octene copolymer with a melting point below 100° C., and the domains have a length-scale of 10–100 $\mu$m on an outer surface of the buffer tube.

According to yet another aspect, the high melting point material is impact modified polypropylene copolymer, and the low melting point material is very low density polyethylene (VLDPE).

The present invention also provides a method of bonding fiber optic buffer tubes. The method includes bundling a plurality of buffer tubes, which tubes are formed of low melting point domains embedded in a high melting point matrix. The method further includes thermally activating the low melting point domains, thereby softening the domains and causing a portion of the domains to bond to domains of a neighboring buffer tube.

According to another characteristic of this method, the thermal activation step is accomplished by applying a heated jacket to the plurality of bundled buffer tubes. Alternatively, the thermal activation step is accomplished by applying heat using IR radiation or a convection oven.

BRIEF DESCRIPTION OF THE DRAWINGS

The invention and advantageous refinements thereof are explained in more detail below with the aid of diagrammatic, exemplary embodiments in the drawings, in which:

FIG. 3(*b*) depicts an optical core including an assembly of buffer tubes according to the second embodiment.

DETAILED DESCRIPTION OF THE PREFERRED EMBODIMENTS

Figure 1:
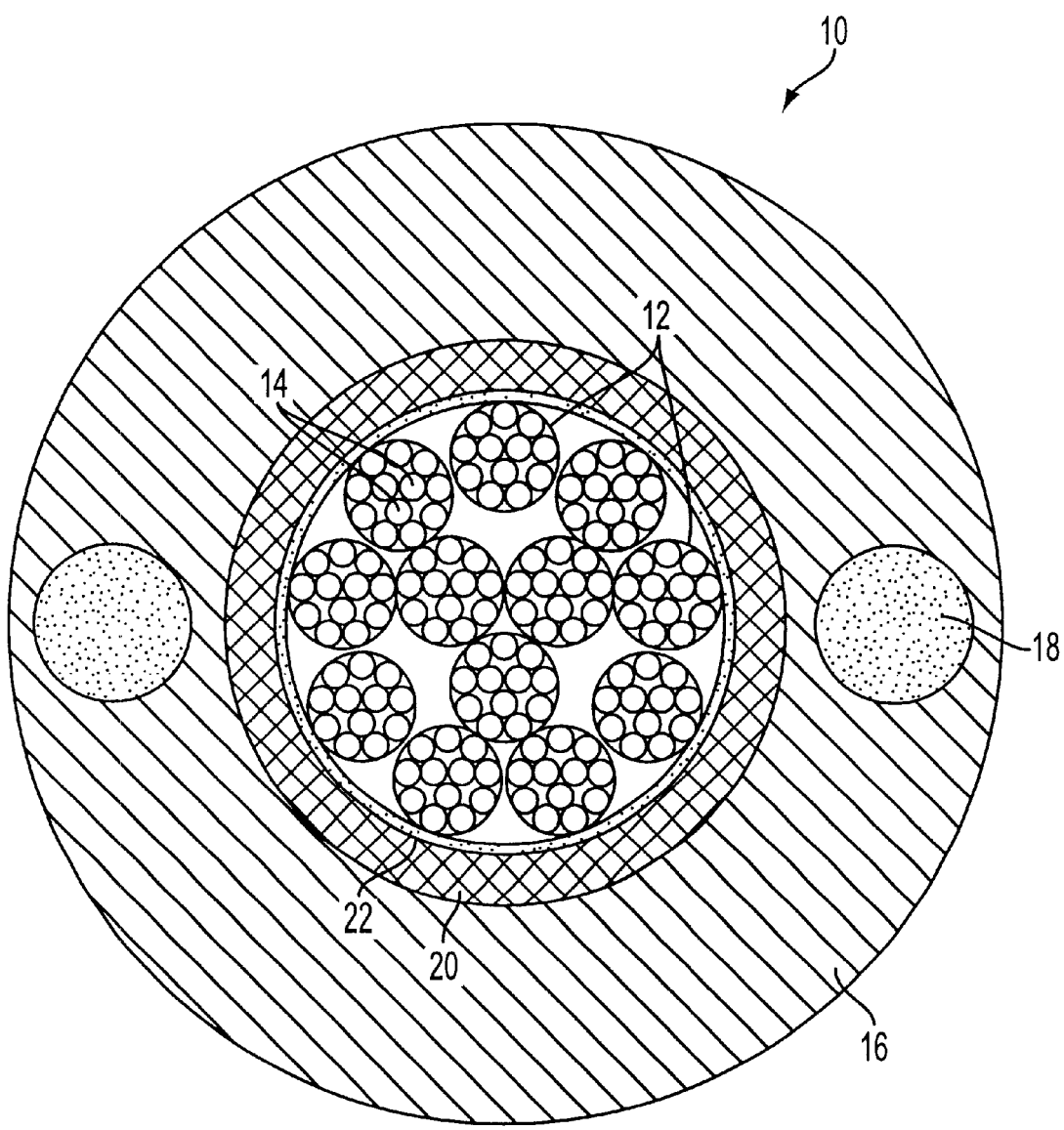
FIG. 1 is a transverse, cross-sectional view of an improved optical-fiber cable according to the present invention.

A first embodiment of the present invention will be described with reference to FIG. 1. FIG. 1 depicts an improved optical-fiber cable according to a first embodiment of the present invention, which cable is designated by reference number 10.

The optical-fiber cable 10 includes an assembly of flexible buffer tubes 12, each of which houses a bundle of standard optical fibers 14. Each buffer tube 12 contains, for example, approximately a dozen optical fibers 14. However, the number of optical fibers 14 may be greater or less than twelve.

In the example illustrated in FIG. 1, the optical-fiber cable 10 includes twelve buffer tubes 12. However, the number of buffer tubes 12 may, for example, vary between seven and twenty four.

The assembly of buffer tubes 12 is contained within a jacket 16. Preferably, the buffer tubes 12 span the length of the jacket 16, as in a standard assembly with a helical or SZ stranding configuration.

Strength members 18 providing reinforcement are at the periphery of the assembly of buffer tubes 12. Preferably, the optical-fiber cable 10 possesses two strength members 18, which are diametrically opposed and embedded in a wall that defines the jacket 16. The structure and assembly of the strength members 18 in the jacket 16 are standard.

Preferably, the optical-fiber cable 10 possesses mechanical-reinforcement strands 20, which are positioned inside the jacket 16 and circumscribe the buffer tube assembly, when in an annular assembly (e.g., arranged helically). As an example, the mechanical reinforcement strands 20 are made of aramid.

In addition, the optical-fiber cable 10 preferably includes standard water-proofing elements. Such water-proofing elements may include a superabsorbant tape 22 positioned between the buffer tubes 12 and the jacket 16 and circumscribing the buffer tube assembly. More specifically, the superabsorbant tape 22 is positioned between the buffer tubes 12 and the assembly of reinforcement strands 20 and circumscribes the buffer tube assembly, in the case of a standard annular assembly.

The water-proofing elements may also include expandable elements (not shown in FIG. 1) positioned within the jacket 16, in the case of a standard interwoven assembly with buffer tubes 12. These elements may also include a typical filler that is utilized between the optical fibers 14 within the buffer tubes 12.

The jacket 16 is made of a polymeric material, such as medium density polyethylene, which is heated and extruded around the buffer tubes 12, with the latter also being made of a polymeric material. It shall be noted that the walls of the buffer tubes 12 are relatively thin.

According to the first embodiment of the present invention, the buffer tubes 12 are held together compactly by adhesion to one another. This is accomplished during the extrusion of the jacket 16 around the buffer tubes 12, by adjusting the extrusion temperature of the material constituting the jacket 16 so as to cause the buffer tubes 12 to adhere to one another. During extrusion, the heated material of the jacket 16 provides the heat energy necessary to cause the buffer tubes to adhere to one another.

The material of the jacket 16 should be selected so as to allow the material to be heated at a selected temperature that is both suitable to effect an optimal extrusion of the jacket and also sufficient to cause the buffer tubes 12 to adhere to one another. Likewise, the material constituting the buffer tubes 12 should be selected so as to allow the buffer tubes 12 to be heated by the heat energy released by the jacket 16, which is extruded at the selected temperature, and to adhere to one another, without being melted by this heat.

In view of these requirements, the jacket is preferably made of polyethylene, in particular, high-density polyethylene, and the buffer tubes 12 are preferably made of polyvinyl chloride (PVC) or of a thermoplastic elastomer possessing flexible diol segments. (A "thermoplastic elastomer possessing flexible diol segments" is a copolymer possessing segments that are polyether or polymer diol units.)

The thermoplastic elastomer possessing flexible diol segments is selected, for example, from the following group:

(i) polyether esters that include, for example, polyether sequences possessing hydroxy terminals, joined to polyester sequences possessing acid terminals, whereby this structure may also comprise diols (e.g., 1,4-butanediol);

(ii) polyurethane ethers that include, for example, polyether sequences possessing hydroxy terminals, joined to diisocyanates by means of urethane functions;

(iii) polyurethane esters that include, for example, polyester sequences possessing hydroxy terminals, joined to diisocyanates by means of urethane functions;

(iv) polyurethane ether esters that include, for example, polyester sequences and polyether sequences possessing hydroxy terminals, with these sequences being joined to diisocyanate residues by means of urethane functions;

(v) polyether amides (i.e., polyethers with polyamide sequences), which are obtained, for example, by having polyamide sequences that possess diamine chain terminals react with polyoxyalkylene sequences that possess dicarboxylic chain terminals; or, by having polyamide sequences that possess diamine chain terminals or polyamide sequences that possess dicarboxylic chain terminals react with polyetherdiols; whereby, the polyether obtained are therefore polyether ester amides.

In particular, the polyether esters are thermoplastic copolyester elastomers. One example of a such a commercial product is the polymer Hytrel®, by DuPont. The international acronym for these thermoplastic elastomers is TEEE (thermoplastic ether-ester elastomer).

It should be noted that buffer tubes 12 made of a thermoplastic elastomer possessing flexible diol segments tear rather easily, in order to permit easy access to the optical fibers 14 contained in the buffer tubes 12.

Moreover, thermoplastic polyurethane elastomers (TPUs) are polyurethane-based copolymers that may be obtained by having both a polymerdiol (or macroglycol with a molecular weight between 1000 and 3500, for example) and possibly a diol (or chain extender of low molecular weight (generally less than 300) react with a diisocyanate.

Examples of such commercial products include: Elastollan® 1185 (PU-ether), Elastollan® 1190 (PU-ether), Elastollan® C85 (PU-ester), Elastollan® C90 (PU-ester), and both Desmopan® 588 (PU-ether ester) and Desmopan® 385 (PU-ether ester), with the polymers of the Elastollan® product line being available from BASF and those of the Desmopan® product line from Bayer.

As an example, when it is extruded around the assembly of buffer tubes 12, a polyethylene jacket 16 is heated at a temperature ranging between 170 and 240° C., and preferably between 200 and 220° C. At this temperature, the jacket 16 releases heat to the buffer tubes 12, which heat is sufficient to pass through any possible layers of reinforcement strands or water-proofing elements and to cause the buffer tubes 12 to adhere to one another, without causing them to melt together.

Figure 2:
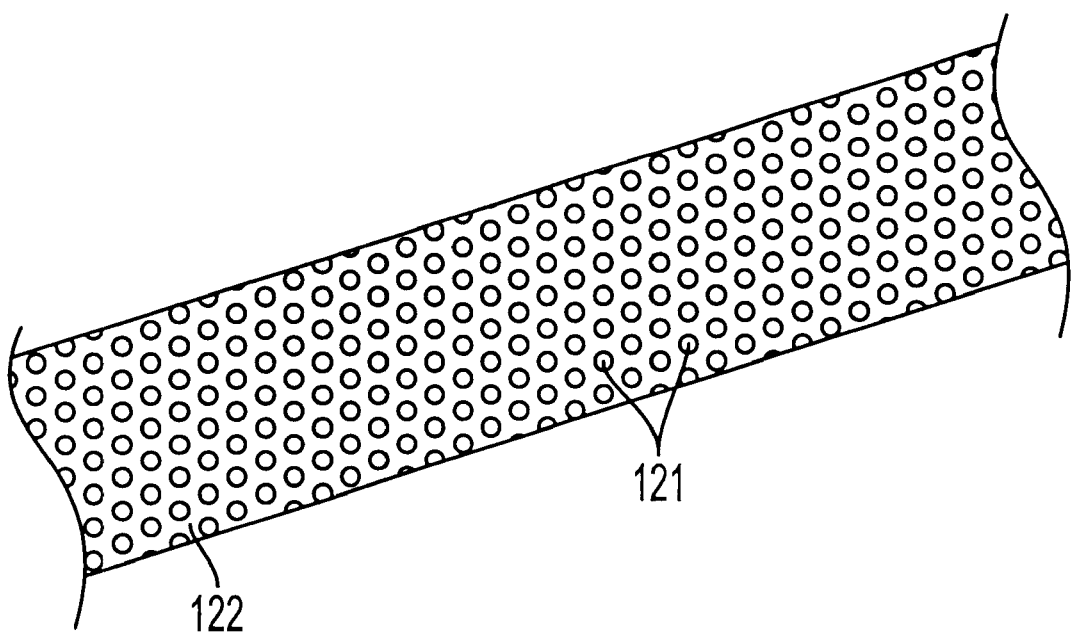
FIG. 2 depicts a buffer tube surface according to a second embodiment of the present invention.

A second embodiment of the present invention will be described with reference to FIGS. 2, 3(*a*), and 3(*b*). FIG. 2 illustrates a surface of a buffer tube 120 according to the second embodiment. As shown in FIG. 2, the buffer tube 120 contains low melting point domains 121 embedded in a higher melting point matrix 122. Preferably, the low melting point domains 121 are formed from a low melting point thermoplastic, while the matrix 122 is formed from a high melting point thermoplastic. Additionally, the buffer tube 120 may contain filler, such as calcium carbonate, talc, or a super absorbent polymer powder.

Figure 3A:
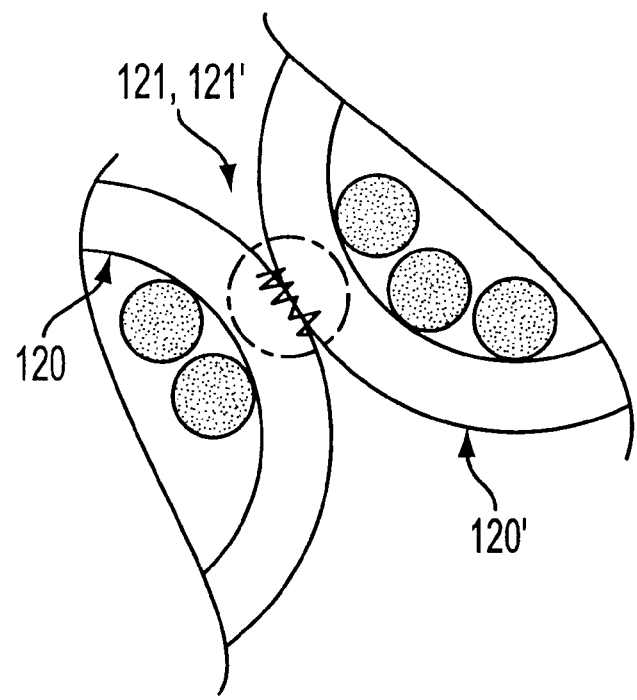
FIG. 3(*a*) illustrates the bundling mechanism for two buffer tubes formed in accordance with the second embodiment.
Figure 3B:
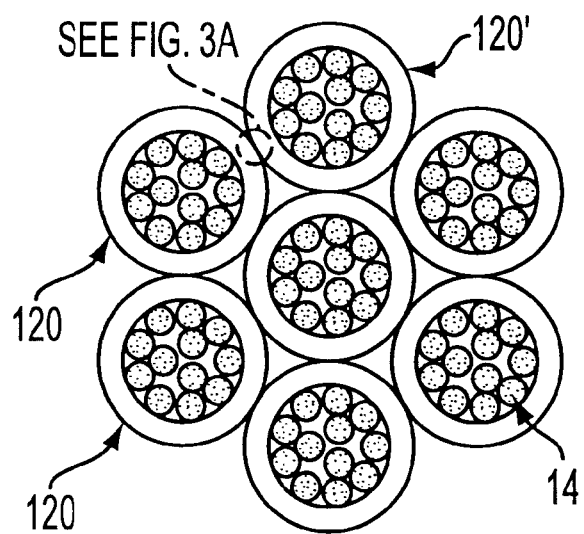

After being arranged in an assembly, as shown in FIG. 3(*b*), the buffer tubes are thermally activated to soften the low melting point domains 121. The domains can be activated through jacketing, as described above with respect to the first embodiment, or by another heat source, such as IR radiation or a convection oven. The activation temperature is selected to be sufficiently high to soften the domains 121, while being suitably low so that the high melting point matrix 122 retains its shape. At such activation temperatures, the low melting point domains 121 melt and become tacky and thereby bond to neighboring low melting point domains 121' on adjacent buffer tubes 120', as is illustrated in FIGS. 3(a) and 3(b). The buffer tubes 120, 120' are then cooled. In this manner, individual buffer tubes 120 are bundled, for example in the assembly shown in FIG. 3(b).

Advantageously, the level of adhesion between the tubes can be controlled through the thermal activation time and temperature, the level of filler, the amounts of low and high melting point components used, and the respective melting points of the low and high melting point components.

The invention is not limited to any specific ratio of filler and low and high melting components. However, the level of adhesion between the tubes can be advantageously adjusted by controlling the ratio of the amounts of filler, low melting point material, and high melting point material, such that the low melting point material constitutes less than 40% of the resulting material, in order to ensure continuity of the high melting point phase. More preferably, the low melting point material constitutes less than 20% of the resulting material. Preferably, less than 40% of the material forming the buffer tubes 120 constitutes filler, such as calcium carbonate, talc, or superabsorbent polymer powder. Preferably, the high melting point material constitutes >50% of the material forming the buffer tubes 120, in order to ensure continuity of this phase.

Preferably, the matrix 122 material has a melting point that is at least 25° C. higher than that of the domain 121 material. More preferably, the melting point of the matrix material is at least 50° C. higher than that of the domain material. Although buffer tubes 120 according to the second embodiment may be formed from a wide variety of materials, preferred materials for the high melting point matrix include impact modified polypropylene copolymer and propylene-ethylene copolymer. Preferred materials for the low melting point domains include low melting point olefin based copolymers or terpolymers, having melting points below 120° C., and preferably below 105° C., such as ethylene-octene copolymer (melting point 70–105° C.), EVA copolymer (melting point 90–110° C.), and EAA copolymer (melting point 90–110° C.).

Examples of such commercial products include: Engage® and Exact® (Ethylene Octene Copolymer), Nucrel® (EVA), Escor® (EAA), and Primacor® (EMAA). The Engage® and Nucrel® product lines are available from DuPont. Exact® and Escor® are available from Exxon, and Primacor® is available from Dow.

In a first example, a propylene-ethylene copolymer with a melting point above 140° C. was used to form the high melting point matrix 122. An ethylene-octene copolymer with a melting point below 100° C. was used to form the low melting point domains 121. In addition, the buffer tubes 120 included a calcium carbonate filler. The buffer tube had 10–100 µm domains 121 on its outer surface.

A second preferred combination of high and low melting point materials includes a matrix formed of impact modified polypropylene copolymer, with a melting point above 150° C., and domains formed of very low density polyethylene (VLDPE), with a melting point of about 90° C.

Advantageously, the assembly of buffer tubes 120, according to the second embodiment, remains bundled without the use of binders. Additionally, individual buffer tubes 120 are removable from the assembly of buffer tubes 130, without damaging either the buffer tubes 120 or the optical fibers contained therein. In addition, the second embodiment is advantageous relative to bonding along the entire length of the buffer tubes. For example, the surface aspect of the buffer tubes 120 is better after separation, with the adhesion according to the second embodiment, relative to tubes which were bonded along their entire surface.

A third embodiment of the present invention provides a stranded optical core formed of flexible buffer tubes. Notably, such optical cores do not include a central strength member.

The third embodiment overcomes the shortcomings of known stranded, flexible buffer tube cables by bonding the buffer tubes at the stranding point. Preferably, the bonds between neighboring buffer tubes are limited such that the buffer tubes can be separated (e.g., during cable splicing operations) by application of a separation force of less than 100 g, and more preferably 50 g.

According to a first aspect, the buffer tubes are bonded by application of ultra-violet (UV) curable materials to the tubes at the stranding point. These materials can be applied by a continuous or intermittent flood, extrusion, or spray. The UV curable material can be applied before or during bundling. After formation, the optical core is then subjected to UV radiation to bond neighboring buffer tubes. UV cured materials such as urethane-acrylate copolymers or other acrylate copolymers can be used to accomplish such bonding.

The present invention provides materials and methods for bundling or stranding optical fiber buffer tubes to form an improved flexible optical core, including an improved flexible optical core assembled in a stranded configuration. The present invention is advantageous in that the assembly of buffer tubes (whether in a helical or SZ stranding configuration) is unlikely to unravel or de-strand under the effects of gravity or other externally applied forces. In particular, the optical core is protected against unraveling because of the adhesion of the buffer tubes to one another. In addition, the buffer tubes are easily separated, despite this adhesion, by exerting a relatively minimal force, generally not exceeding one (1) Newton on each buffer tube. This easy separation affords easy access to the optical fibers during connection operations. Furthermore, the present invention avoids the use of binders, thereby advantageously permitting use of flexible buffer tube cables.

While this invention has been particularly shown and described with reference to preferred embodiments thereof, it will be understood by those skilled in the art that various changes in form and details may be made thereto without departing from the spirit and scope of the invention as defined by the appended claims.

What is claimed:

1. An optical-fiber cable comprising:
an assembly of buffer tubes comprising at least two flexible buffer tubes that are thermally bonded to one another;
a plurality of optical fibers, which are housed within said buffer tubes; and
a jacket surrounding said assembly of buffer tubes.

2. A cable according to claim 1, wherein said jacket comprises polyethylene and said buffer tubes comprise polyvinyl chloride (PVC).

3. A cable according to claim 1, wherein said jacket comprises polyethylene and said buffer tubes comprise a thermoplastic elastomer possessing flexible diol segments.

4. A cable according to claim 1, wherein said jacket comprises a polypropylene copolymer.

5. A cable according to claim 1, wherein said buffer tubes are contained within said jacket in a helical or SZ stranding configuration.

6. A cable according to claim 1, further comprising mechanical reinforcement strands positioned between said buffer tubes and jacket, wherein said assembly of buffer tubes is an annular assembly.

7. A cable according to claim 6, wherein said mechanical reinforcement strands comprise aramid.

8. A cable according to claim 6, wherein said mechanical reinforcement strands comprise glass.

9. A cable according to claim 6, wherein said mechanical reinforcement strands are arranged helically.

10. A cable according to claim 1, further comprising water-proofing tape positioned between said buffer tubes and said jacket, wherein said assembly of buffer tubes is an annular assembly.

11. A cable according to claim 1, further comprising expandable water-proofing elements positioned within said jacket, wherein said assembly of buffer tubes is an interwoven assembly of buffer tubes.

12. A cable according to claim 1, further comprising a filler material within said buffer tubes.

13. A cable according to claim 1, further comprising at least one strength member that is provided at the periphery of said assembly of buffer tubes.

14. A cable according to claim 13, wherein said strength member is embedded in a wall of said jacket.

15. A fabrication process for an optical fiber cable comprising:
    forming an assembly having at least two flexible buffer tubes, the buffer tubes comprising a polymeric material and housing optical fibers;
    heating a jacket comprising a polymeric material to an extrusion temperature;
    extruding the jacket around the buffer tubes to surround the assembly of buffer tubes; and
    thermally bonding the buffer tubes to one another by controlling the extrusion temperature of the polymeric jacket material.

16. A process according to claim 15, wherein the polymeric jacket material is polyethylene, and the polymeric buffer tube material is polyvinyl chloride (PVC) or a thermoplastic elastomer possessing flexible diol segments, wherein the extrusion temperature is between 170 and 240° C.

17. A process according to claim 16, wherein the extrusion temperature is between 200 and 220° C.

18. A process according to claim 15, further comprising providing at least one strength member at the periphery of the assembly of buffer tubes.

19. A cable according to claim 1, wherein said buffer tubes comprise a low melting point material forming domains and a high melting point material forming a matrix, wherein said domains are embedded in said matrix.

20. A fiber optic buffer tube comprising:
    a low melting point material forming domains; and
    a high melting point material forming a matrix, wherein said domains are embedded in said matrix.

21. A fiber optic buffer tube according to claim 20, wherein said low melting point material comprises a low melting point thermoplastic, and said high melting point material comprises a high melting point thermoplastic.

22. A fiber optic buffer tube according to claim 20, wherein said low melting point material constitutes less than forty percent of a material comprising said low and high melting point materials.

23. A fiber optic buffer tube according to claim 22, wherein said low melting point material constitutes less than twenty percent of said material.

24. A fiber optic buffer tube according to claim 20, further comprising a filler.

25. A fiber optic buffer tube according to claim 24, wherein said filler is selected from the group consisting of calcium carbonate, talc, and super-absorbent polymer powder.

26. A fiber optic buffer tube according to claim 24, wherein said filler constitutes less than forty percent of a buffer tube material comprising said filler and said low and high melting point materials.

27. A fiber optic buffer tube according to claim 26, wherein said low melting point material constitutes less than forty percent of said buffer tube material and said high melting point material constitutes more than fifty percent of said buffer tube material.

28. A fiber optic buffer tube according to claim 20, wherein said high melting point material has a melting point which is at least 25° C. higher than a melting point of said low melting point material.

29. A fiber optic buffer tube according to claim 28, wherein the melting point of said high melting material is at least 50° C. higher than the melting point of said low melting point material.

30. A fiber optic buffer tube according to claim 20, wherein said low melting point material comprises a low melting point olefin based copolymer or terpolymer.

31. A fiber optic buffer tube according to claim 30, wherein said low melting point material is selected from the group consisting of ethylene-octene copolymer, EVA copolymer, and EAA copolymer.

32. A fiber optic buffer tube according to claim 20, wherein said high melting point material comprises impact modified polypropylene copolymer or propylene-ethylene copolymer.

33. A fiber optic buffer tube according to claim 32, wherein said low melting point material comprises a low melting point olefin based copolymer or terpolymer.

34. A fiber optic buffer tube according to claim 32, wherein said low melting point material is selected from the group consisting of ethylene-octene copolymer, EVA copolymer, and EAA copolymer.

35. A fiber optic buffer tube according to claim 34, further comprising a calcium carbonate filler, wherein said high melting point material comprises a propylene-ethylene copolymer with a melting point above 140° C., wherein said low melting point material comprises an ethylene-octene copolymer with a melting point below 100° C., and wherein said domains have a length-scale of 10–100 μm on an outer surface of said buffer tube.

36. A fiber optic buffer tube according to claim 34, wherein said high melting point material comprises impact modified polypropylene copolymer, and wherein said low melting point material comprises very low density polyethylene (VLDPE).

37. A method of bonding fiber optic buffer tubes, said method comprising:
    bundling a plurality of buffer tubes comprising low melting point domains embedded in a high melting point matrix;
    thermally activating the low melting point domains, thereby softening the domains and causing a portion of the domains to bond to domains of a neighboring buffer tube.

38. A method of bonding fiber optic buffer tubes according to claim 37, wherein said thermal activation step is accomplished by applying a heated jacket to the plurality of bundled buffer tubes.

39. A method of bonding fiber optic buffer tubes according to claim 37, wherein said thermal activation step is accomplished by applying heat using IR radiation or a convection oven.

40. A method of bonding fiber optic tubes comprising:

applying an overcoating of a UV curable material to at least two fiber optic tubes;

bundling the fiber optic tubes; and irradiating the fiber optic tubes with ultra-violet radiation to polymerize the UV curable material.

41. A method of bonding fiber optic tubes according to claim 40, wherein the UV curable material comprises an acrylate copolymer.

42. A method of bonding fiber optic tubes according to claim 41, wherein the UV curable material comprises a urethane-acrylate copolymer.

43. A method of bonding fiber optic tubes according to claim 40, wherein said applying step is performed during said bundling step.

44. A method of bonding fiber optic tubes according to claim 43, wherein the overcoating is applied at a stranding point.

45. A method according to claim 39, wherein said applying step is performed before said bundling step.

* * * * *